(12) United States Patent
Begum et al.

(10) Patent No.: US 6,169,724 B1
(45) Date of Patent: Jan. 2, 2001

(54) EGRESS NETWORK SERVICE MONITOR

(75) Inventors: Akhtar Jh Begum, Holmdel; Rajat Chanda, Howell, both of NJ (US)

(73) Assignee: AT&T Corp., New York, NY (US)

( * ) Notice: Under 35 U.S.C. 154(b), the term of this patent shall be extended for 0 days.

(21) Appl. No.: 08/915,002

(22) Filed: Aug. 20, 1997

(51) Int. Cl.⁷ .......................... G06F 11/00; G05B 23/02; H04M 7/00
(52) U.S. Cl. .................. 370/216; 370/244; 370/252; 340/825.06; 379/221
(58) Field of Search .................................. 370/216, 242, 370/250, 252, 244; 340/825.06, 825.07; 714/704, 712; 379/26, 221, 201, 222, 207, 202, 265

(56) References Cited

U.S. PATENT DOCUMENTS

| | | | |
|---|---|---|---|
| 5,327,489 | * 7/1994 | Anderson et al. | 379/207 |
| 5,659,593 | * 8/1997 | Tzvieli | 370/244 |
| 5,745,777 | * 4/1998 | English et al. | 340/825.06 |
| 5,815,566 | * 9/1998 | Ramot et al. | 379/265 |
| 5,850,385 | * 12/1998 | Esaki | 370/216 |

* cited by examiner

*Primary Examiner*—Alpus H. Hsu
*Assistant Examiner*—Afsar M Qureshi

(57) ABSTRACT

A method of recognizing a call failure related problem occurring at an egress network of a telephone system wherein information relating to call failures occurring at the egress network is provided by an out-of-band signaling system. The method includes determining a tolerable call failure rate, calculating a threshold based on the tolerable call failure rate using a standard deviation, calculating a measured call failure rate at the egress network, and comparing the measured call failure rate to the threshold and recognizing the measured call failure rate exceeds the threshold. In addition, a system for recognizing a call failure related problem occurring at an egress network is described. The system includes a terminating switch, and out-of-band signaling system, a loop around trunk coupled to the terminating switch and a protocol analyzer coupled to the loop around trunk for monitoring the information relating to call failures, calculating a measured call failure rate, comparing a measured call failure rate to threshold and recognizing when the measured call failure rate exceeds the threshold. In an alternate embodiment of the system, a host computer is coupled to the protocol analyzer wherein the host computer calculates the measured call failure rate, compares the measured call failure rate to a threshold, and recognizes when the measured call failure rate exceeds the threshold.

11 Claims, 2 Drawing Sheets

EGRESS NETWORK SERVICE MONITOR

FIELD OF THE INVENTION

The present invention relates to a method and apparatus for passively monitoring egress service problems occurring on a telephone network.

BACKGROUND OF THE INVENTION

FIG. 1 shows a block diagram of a conventional long distance telephone network which includes interexchange carrier 5, also known as an IXC, for routing long distance telephone calls. IXC 5 may be, for example, the network of any long distance carrier such as the AT&T long distance network.

As shown in FIG. 1, calling party 10 is connected to local exchange carrier 15, also known as LEC, which includes a local switch, an example of which is the No. 5 electronic switching system, or No. 5 ESS. Local switches such as the No. 5 ESS are well known in the art. When the calling party 10 desires to make a long distance call by inputting a long distance telephone number, the LEC 15 is able to recognize this fact by examining the dialed number and searching for an appropriate prefix which indicates that the call is long distance call. When the LEC 15 determines that a call placed by the calling party 10 is a long distance call and it belongs to IXC 5, the LEC 15 routes the call to IXC 5. It should be noted that, because there are a variety of long distance carriers available, such as AT&T, MCI or Sprint, that could be IXC 5 in FIG. 1, the LEC 15 is preprogrammed to know which particular long distance carrier the calling party 10 has chosen for its long distance service. As a result, the LEC 15 is able to route the call to the appropriate IXC 5.

As shown in FIG. 1, IXC 5 includes IXC originating switch (OS) 20, IXC switched network 25, and IXC terminating switch (TS) 30. Originating switch 20 and terminating switch 30 are electronic switching systems such as a No. 4 ESS. Similarly, IXC switched network 25 is made up of a plurality of such electronic switching systems and network databases capable of instructing switches for routing the long distance call placed by the calling party 10. As can be seen in FIG. 1, LEC 15 is connected to originating switch 20 which in turn is connected through the IXC switched network 25 via the transport network to terminating switch 30, thereby providing the means through which a long distance call placed by the calling party 10 is routed through IXC 5. The transport network consists of voice/data trunks and the "Signaling System 7" (SS7) signaling network.

The arrangement where signaling messages are transported by the voice/data trunks as audible tones is called "in-band" signalling. When a dedicated path exists to carry signalling messages as data packets, the signalling is said to be "out-of-band." The best known examples of out-of-band paths are SS7 and ISDN, which stands for Integrated Services Digital Network.

Terminating switch 30 is connected to LEC 35 by voice/data trunk 33, which in turn is connected to called party 40. Similarly, terminating switch 30 may also be directly connected to private branch exchange 45, also known as a PBX, by voice/data trunk 43, which in turn is connected to called party 50. Private branch exchanges are well known in the art and are generally any switching system owned or leased by a business or organization to provide both internal switching functions and access to the public telephone network. Thus, in FIG. 1, called party 40 is generally any member of the general public or a business whose access to IXC 5 is through LEC 35, whereas called party 50 is generally a member of a business or organization whose access to IXC 5 is through PBX 45.

Accordingly, a long distance call placed by calling party 10 intended for either called party 40 or called party 50 can be routed by the LEC 15 to the IXC 5 where it passes from originating switch 20 to IXC switched network 25 to terminating switch 30. From terminating switch 30, the call is routed to either called party 40 through voice data trunk 33 and LEC 35 or called party 50 through direct voice/data trunk 43, bypassing LEC 35, to PBX 45, whichever is appropriate.

The part of the conventional long distance telephone network shown in FIG. 1 in which a call is routed from terminating switch 30 to either called party 40 through LEC 35 or called party 50 through PBX 45 is generally called the egress network. The egress network is so named because it is the part of the network where a call leaves IXC 5. In general, IXCs are very reliable. By "completes" it is meant that the call passes from the originating switch 20 to the terminating switch 30. Most call failures, meaning that the call is not completed to either called party 40 or called party 50, occur at the egress network, that is where the call leaves IXC 5 and is sent either to LEC 35 or PBX 45, whichever the case may be.

There are several types of specific call failures occurring at the egress network, referred to herein as egress problems. Each egress problem may indicate a particular problem associated with either LEC 35 and called party 40 or PBX 45 and called party 50. A number of different egress problems will be described in detail below.

A simple example of an egress problem is known as "line busy" and occurs when a call cannot be completed because the called party's line is in use. In the case where the called party is a business or organization, such a condition may indicate that the business or organization does not have enough lines to handle incoming traffic.

Another example of an egress problem is known as either "reorder" or "fast busy" and occurs when there is no available line for a particular call in voice data trunk 33 or 43 due to large call traffic. As a result, the calling party 10 will either hear an announcement indicating that the network is busy and instructing the called party 10 to call again at a later time (reorder) or will hear a fast busy tone (fast busy). Reorder and fast busy are problems that often occur when a business or organization launches a new promotion and a large number of callers attempt to simultaneously call a number provided in the promotion.

Another egress problem is known as "call abandoned" and is directly related to the behavior of the calling party 10. In call abandoned, the call makes it to the called party 40 or called party 50 but the calling party 10 terminates the call before the called party 40 or called party 50 can answer the call. In the case where the called party is a business or organization, such a condition may indicate that either more agents are needed to answer calls more quickly or that the existing agents need to be trained to answer calls more quickly.

Still another common egress problem is known as "wink timeout." When the terminating switch 30 is ready to route a call to either LEC 35 or PBX 45, the terminating switch sends a signal to the LEC 35 or PBX 45 called a "wink" that tells the LEC 35 or PBX 45 to expect a call. In response, the LEC 35 or PBX 45 sends back a signal within a predetermined time frame indicating that it is ready to receive the call. In a wink timeout situation, the terminating switch 30 does not receive the signal from the LEC 35 or PBX 45, and, as a result, never sends the call. The calling party 10 then hears an announcement instructing the calling party 10 to call again at a later time. Wink timeout egress problems may indicate an equipment problem at either LEC 35 or PBX 45.

A final egress problem is known as "no supervision." Under normal conditions, after the wink is sent out by terminating switch 30 and after the signal is received back from the LEC 35 or PBX 45, the call is sent through to the called party 40 or called party 50, whichever is appropriate, and as the call is answered, a second signal called answer supervision is sent from the LEC 35 or PBX 45 to the terminating switch 30. This second signal triggers the charging mechanism. In no supervision situations, the answer supervision signal is never received by the terminating switch 30 and, as a result, the call cannot be billed and treated. In international calls, the voice paths will remain partially blocked. As was the case with wink timeout, no supervision may indicate an equipment problem at either LEC 35 or PBX 45.

Although the most common egress problems have been described above, it should be understood that other egress problems may exist which effect call completion and that such additional egress problems are intended to be within the scope of the present invention.

In all of the egress problems described above, the called party is not aware of the attempted call and subsequent call failure. As a result, the called party is unable to track and monitor the number of and frequency of such call failures and thus misses the opportunity to address and correct the problems that may be associated therewith.

SUMMARY OF THE INVENTION

A method of recognizing a call failure related problem occurring at an egress network of a telephone system is described wherein information relating to call failures occurring at the egress network is provided by an out-of-band signaling system. The method comprises the steps of determining a tolerable call failure rate by sampling a plurality of calls at the egress network and monitoring the information relating to call failures associated with the plurality of calls, calculating a threshold based on the tolerable call failure rate using a standard deviation associated with the determining step, calculating a measured call failure rate at the egress network by sampling a predetermined percentage of calls at the egress network and monitoring the information relating to call failures associated with the predetermined percentage of calls, and comparing the measured call failure rate to the threshold and recognizing when the measured call failure rate exceeds the threshold.

A system for recognizing a call failure related problem occurring at an egress network of a telephone system is also described. The system includes a terminating switch, an out-of-band signaling system for providing information relating to call failures occurring at the egress network, a loop around trunk coupled to the terminating switch for sampling a predetermined percentage of calls at the egress network and a protocol analyzer coupled to the loop around trunk for monitoring the information relating to call failures associated with the predetermined percentage of calls, calculating a measured call failure rate based on the monitored information relating to call failures, and comparing the measured call failure rate to a threshold and recognizing when the measured call failure rate exceeds the threshold. In the system, a tolerable call failure rate is calculated by sampling a plurality of calls at the egress network and monitoring the information relating to call failures associated with the plurality of calls. In addition, the threshold is calculated based on the tolerable call failure rate and a standard deviation associated with the calculation of the tolerable call failure rate.

In an alternate embodiment of the system, a host computer is coupled to the protocol analyzer for calculating the measured call failure rate based on the monitored information relating to call failures, comparing the measured call failure rate to a threshold, and recognizing when the measured call failure rate excesses the threshold.

DETAILED DESCRIPTION OF PREFERRED EMBODIMENTS

Figure 1:
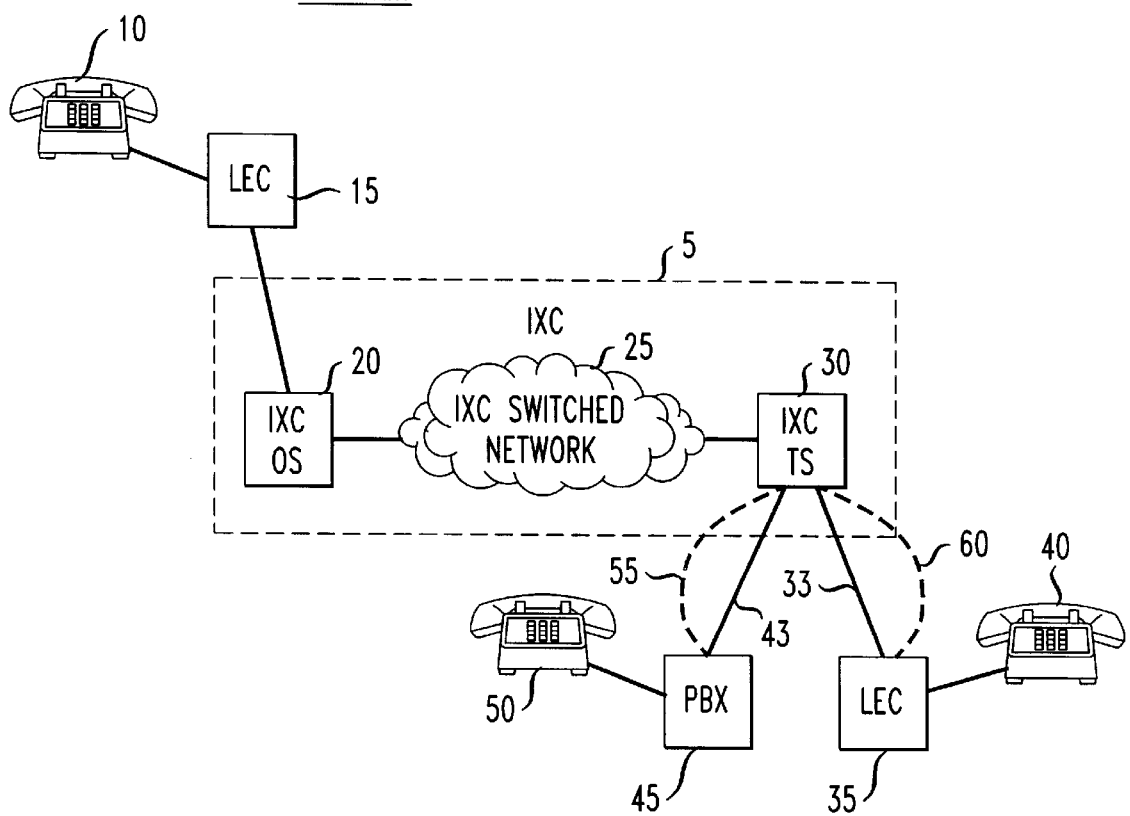
FIG. 1 is a block diagram of a conventional long distance telephone network.

In the preferred embodiment of the present invention, a service monitoring system is provided in which call completion can be maximized by proactively alerting customers, that is called party 40 or called party 50, as to why certain calls were not completed. As a result, the customer can address problems such as equipment failure, staffing or capacity problems.

According to an aspect of the present invention, for each egress problem described above, also known as a call failure category, an average number of call failures due to the particular egress problem that is tolerable to the customer is determined. For example, a particular customer may be able to tolerate 5% of calls failing due to line busy and 1% of calls failing due to reorder. These average tolerable failure rates make up what is known as the customer's profile.

The average call failure rates that make up the customer's profile are preferably set by sampling the customer's call traffic and monitoring the customer's call completion and call failure rate in each call failure category for a predetermined period of time and working with the customer to determine a tolerable average value. In particular, for each call failure category, a predetermined number, n, of call disposition samplings are taken, each for a certain period of time, e.g. one day. For each sampling, a call failure rate due to the particular egress problem is calculated. These call failure rates are represented by $X_i$ where i equals 1 to n. Thus, for each call failure category, the average call failure rate, $\overline{X}$, can be calculated according to the following formula:

$$\overline{X} = \sum_{i=1}^{n} X_i / n$$

Once the customer's profile has been determined as described above, it is necessary to develop an alerting strategy which determines when an alarm should be raised, that is when the customer is to be alerted that the average tolerable call failure rate has been exceeded for a particular call failure category. In practice, actual call failure rates within each call failure category undergo statistical fluctuations. Thus, it is not desirable to use the average call failure values in the customer's profile as the absolute threshold for determining when an alarm should be raised because uncertainty due to the above described fluctuations together with possible sampling error raises a risk that an unacceptable rate of false alarms will be generated. Instead, it is preferable to calculate a threshold value to be used that takes into account the random fluctuations as described above. Thus, according to an aspect of the present invention, a standard deviation, which is a measure of randomness or error, is calculated for each call failure category according to the following formula:

$$\sigma = \left[ 1/n \sum_{i=1}^{n} X_i^2 - \overline{X}^2 \right]^{1/2},$$

where $X_i$, $\overline{X}$ and n are as described above. The calculated standard deviation is then used to determine a threshold with a particular confidence limit (CL) where the confidence limit determines the level of certainty in the calculation. In particular, a threshold with a 95% confidence limit can be determined according to the following formula:

Threshold with 95% CL=$\overline{X}$+1.96 σ.

If that threshold is exceeded while a customers calls are being monitored, it is 95% certain that a legitimate problem exists rather than a false alarm due to normal statistical fluctuations. Similarly, a threshold with a 99% confidence limit can be determined according to the following formula:

Threshold with 99% CL=$\overline{X}$+2.58 σ.

If that threshold is exceeded, it is 99% certain that a legitimate problem exists rather than a false alarm due to normal statistical fluctuations.

It should be noted that it is possible for a customer to simply provide acceptable thresholds for each call failure category without deviating from the scope of the present invention.

Thus, according to an aspect of the present invention, the customer's calls are sampled and the occurrence of call failures in each call failure category is monitored. The monitored call failure rates for each call failure category are compared to the threshold value for that call failure category as calculated above or specified by a customer. If the measured value exceeds the threshold, an alarm is raised and the customer is alerted. The alerting of the customer can be done immediately after the threshold is exceeded by, for example, sending the customer a written report or an electronic message. Also, the customer can be provided with a periodic report, such as weekly or monthly, that notifies the customer of any alarm situations that occurred in each call failure category during the relevant period. Finally, the customer can be given access to the monitoring system, to be described in detail below, so that the customer can access the system at their convenience to obtain call failure information.

It should be noted, however, that for each call failure category, it is necessary to collect a minimum number of calls in order to obtain a statistically valid sample. For example, for a call failure rate of 5%, in order to be statistically valid, at least 20 calls must be sampled, and for a call failure rate of 2%, in order to be statistically valid, at least 50 calls must be sampled. How soon these minimum number of calls are collected is determined by the customer's call volume and the rate at which the customer's calls are sampled.

Referring to FIG. 1, signaling information relating to the occurrence of egress problems may be carried and transmitted in one of two ways. The first way is called in-band signalling. In in-band signaling, the signaling information relating to the occurrence of egress problems is carried by voice data trunks 33 and 43 using audible tones. The second way is called out-of-band signalling. In out-of-band signalling, the signaling information relating to the occurrence of egress problems is carried by a dedicated network or channel in the form of digital messages. In particular, in the case of PBX 45, this dedicated network is the integrated services digital network, also known as ISDN, and in the case of LEC 35, this dedicated network is the signalling system 7 network, also known as SS-7. Both ISDN and SS-7 are well known in the art. Thus, as shown in FIG. 1, ISDN line 55 connects terminating switch 30 to PBX 45 and SS-7 line 60 connects terminating switch 30 to LEC 35. In the case where out of band signaling is used, both the signalling information and the voice and data are carried by either ISDN line 55 or SS-7 line 60, whichever the case may be.

Figure 2:
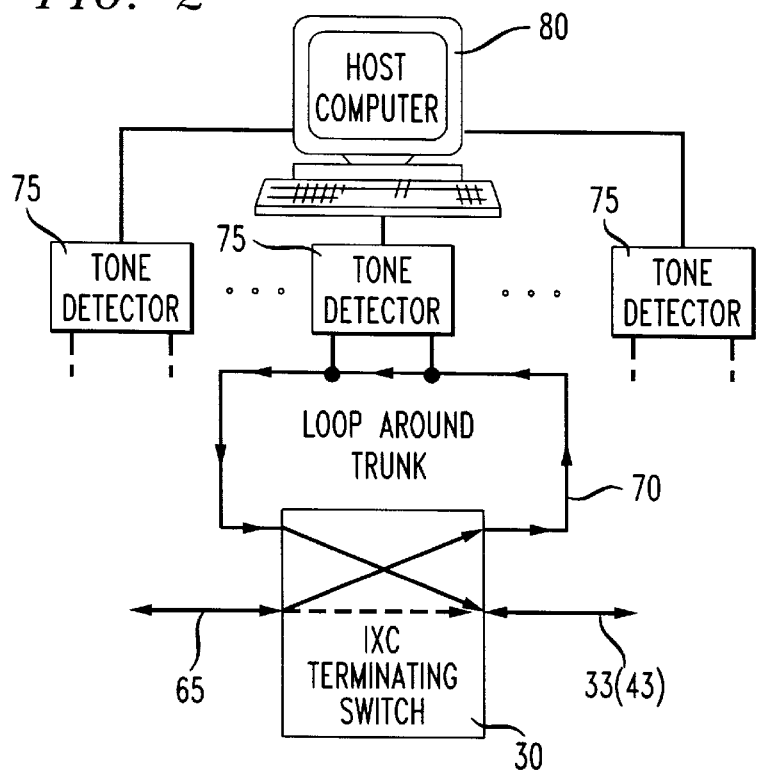
FIG. 2 is a block diagram of a configuration for monitoring egress problems according to an aspect of the present invention in which a loop around trunk carries in-band signaling tones.

Referring to FIG. 2, a block diagram of a configuration for monitoring the signalling information relating to egress problems according to an aspect of the present invention is shown. In particular, FIG. 2 shows a configuration for monitoring in-band signalling information.

As shown in FIG. 2, incoming calls to the terminating switch 30 from voice data trunk 65 can either be routed directly to voice data trunk 33 (43) or can be routed to loop around trunk 70. Coupled to loop around trunk 70 is tone detector 75. Tone detector 75 is capable of passively monitoring signalling information relating to call failure which, as discussed above, is in the form of audible tones when in-band signalling is used. Specifically, tone detector 75 is able to decode the multi-frequency tones to extract the signalling information therefrom. Tone detectors are well known in the art, an example of which is the Telescience 4010 Network Analysis Terminal.

In particular, when a call fails due to a particular egress problem, a set of tones indicating such a failure is sent back from voice data trunk 33 (43) to terminating switch 30 and through loop around trunk 70 where the tones are passively monitored by tone detector 75. The tone detector 75 collects and processes the detected and decoded signalling information filed by destination addresses. As discussed in detail above, for each call failure category, a call failure rate can thus be calculated by the tone detector 75 and compared to the relevant threshold. In an alternate embodiment, the information relating to call failures detected and decoded by the tone detector 75 is collected and processed by host centralized computer 80, which may collect information from various tone detectors co-located with various terminating switches. For each call failure category, a call failure rate can be calculated by the host computer 80 and compared to the relevant threshold. In either embodiment, the customer can then be alerted if and when that call failure rate exceeds the particular threshold in the customer's profile.

It should be noted that, in practice, for efficiency purposes, only an appropriate portion or percentage of each customers calls need be routed through loop around trunk 70. In other words, a portion of the customers calls can be routed directly to voice data trunk 33 (43) without passing through loop around trunk 70. The particular portion or percentage of calls that is routed through loop around trunk 70 will depend on the size of the customer and the customer's call traffic.

Figure 3:
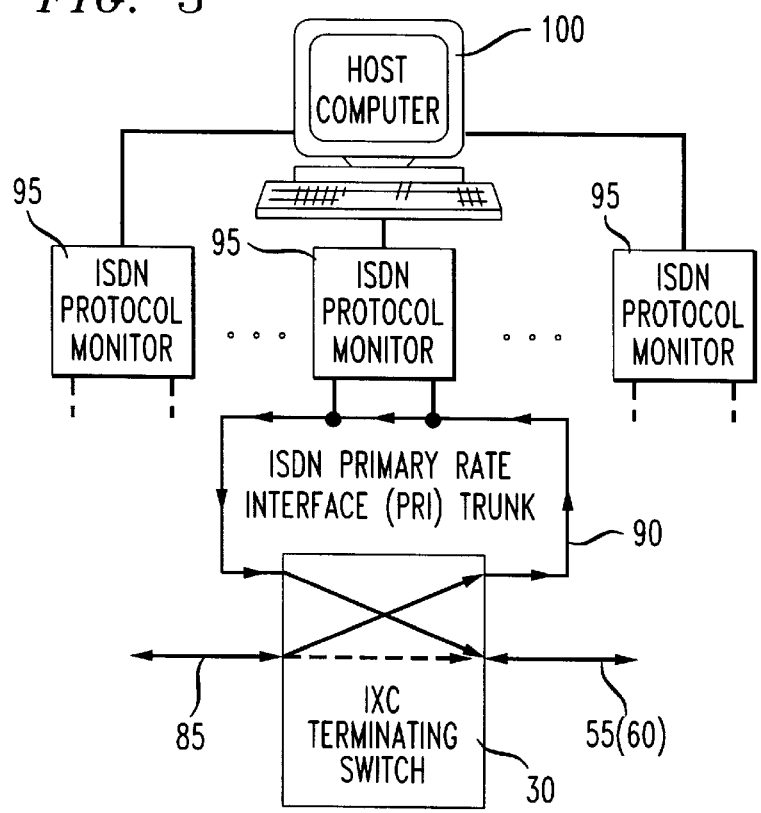
FIG. 3 is a block diagram of a configuration for monitoring egress problems according to an aspect of the present invention in which a loop around trunk includes an out-of-band signaling path.

Referring to FIG. 3, a block diagram of a configuration for monitoring the signalling information relating to egress problems according to a further aspect of the present invention is shown. In particular, FIG. 3 shows a configuration for monitoring out-of-band signalling information.

As shown in FIG. 3, incoming calls to the terminating switch 30 from line 85 can either be routed directly to ISDN line 55 or SS-7 line 60, whichever is appropriate, or they can be routed to loop around ISDN Primary Rate Interface (PRI) trunk 90. Coupled to loop around trunk 90 is an ISDN protocol monitor 95. ISDN lines include what are know as the B-channel, which carries voice and data, and the D-channel, which carries the signalling information described above. The protocol monitor 95 is capable of passively monitoring signalling information relating to call failures which is carried on the D-channel. Specifically, the protocol monitor 95 is able to decode ISDN D-channel out-of-band signalling messages, also known as Q.931 messages. Protocol monitors are well known in the art, an example of which is the AT&T Systems for Test Access and Maintenance of Protocol-based Services, also known as STAMPS, protocol analyzer system often used for ISDN pre-service testing and maintenance.

Similar to the case involving the configuration shown in FIG. 2, when a call fails due to a particular egress problem, a signalling message indicating such a failure is sent back from either ISDN line 55 or SS-7 line 60, whichever the case may be, and through loop around trunk 90 where the message is monitored by protocol monitor 95. The protocol monitor 95 collects and processes the decoded signalling information. As discussed in detail above, for each call failure category, a call failure rate can be calculated by the protocol monitor 95 and compared to the relevant threshold. In an alternate embodiment, the information relating to call failures decoded by a number of protocol monitors 95 located at multiple terminating switches may be collected and processed by centralized host computer 100. For each call failure category, a call failure rate can be calculated by the host computer 100 and compared to the relevant threshold. In either embodiment, the customer can then be alerted if and when that call failure rate exceeds the particular threshold in the customer's profile. As was also the case with the configuration shown in FIG. 2, only an appropriate portion or percentage of each customer's calls need be routed through loop around trunk 90.

When host computer 100 collects information from a number of terminating switches 30 located within IXC 5, a large customer that has connections to more than one terminating switch 30 can have its call failure information centrally collected and monitored, thereby giving the customer a picture of its overall call completion situation.

While presently preferred embodiments of the invention have been disclosed, it is to be understood that the invention is not limited thereto, but that many modifications will be apparent to those of skill in the art without deviating from the scope of the appended claims.

What is claimed is:

1. A system for recognizing a call failure related problem occurring at an egress network of a telephone system, comprising:
    a terminating switch;
    an out-of-band signaling system for providing information relating to call failures occurring at said egress network;
    a loop around trunk coupled to said terminating switch for sampling a predetermined percentage of calls at said egress network;
    a protocol analyzer coupled to said loop around trunk for monitoring said information relating to call failures associated with said predetermined percentage of calls; and
    a host computer coupled to said protocol analyzer for calculating a measured call failure rate based on said monitored information relating to call failures, comparing said measured call failure rate to a threshold, and recognizing when said measured call failure rate exceeds said threshold;
    wherein a tolerable call failure rate is calculated by sampling a plurality of calls at said egress network and monitoring said information relating to call failures associated with said plurality of calls and wherein said threshold is calculated based on said tolerable call failure rate and a standard deviation associated with said calculation of said tolerable call failure rate.

2. A system according to claim 1, wherein, before said protocol analyzer calculates said measured call failure rate, said loop around trunk samples a statistically valid number of calls.

3. A system according to claim 1, wherein said out-of-band signalling system comprises a D-channel of an ISDN line.

4. A system according to claim 1, wherein said out-of-band signalling system comprises an SS-7 line.

5. A system according to claim 1, wherein said threshold is calculated using a particular confidence limit.

6. A method of recognizing a call failure related problem occurring at an egress network of a telephone system and effecting call completion, wherein information relating to call failures occurring at said egress network is provided by an out-of-band signaling system, said method comprising the steps of:
    determining a tolerable call failure rate by sampling a plurality of calls at said egress network and monitoring said information relating to call failures associated with said plurality of calls;
    calculating a threshold based on said tolerable call failure rate using a standard deviation associated with said determining step;
    calculating a measured call failure rate at said egress network by sampling a predetermined percentage of calls at said egress network and monitoring said information relating to call failures associated with said predetermined percentage of calls; and
    comparing said measured call failure rate to said threshold and recognizing when said measured call failure rate exceeds said threshold;
    wherein said out-of-band signaling system comprises a D-channel of an ISDN line.

7. A method of recognizing a call failure related problem occurring at an egress network of a telephone system and effecting call completion, wherein information relating to call failures occurring at said egress network is provided by an out-of-band signaling system, said method comprising the steps of:
    determining a tolerable call failure rate by sampling a plurality of calls at said egress network and monitoring said information relating to call failures associated with said plurality of calls;
    calculating a threshold based on said tolerable call failure rate using a standard deviation associated with said determining step;
    calculating a measured call failure rate at said egress network by sampling a predetermined percentage of calls at said egress network and monitoring said information relating to call failures associated with said predetermined percentage of calls; and
    comparing said measured call failure rate to said threshold and recognizing when said measured call failure rate exceeds said threshold;

wherein said determining step comprises calculating a plurality of call failure rates using a plurality of separate samples of calls and calculating an average of said plurality of call failure rates; and, wherein said standard deviation is calculated according to the following formula:

$$\left[\frac{1}{n}\sum_{i=1}^{n} X_i^2 - \overline{X}^2\right]^{\frac{1}{2}},$$

wherein $\overline{X}$ is said average of said plurality of call failure rates, $X_i$ is each of said plurality of call failure rates, and n is a total number of said plurality of call failure rates.

8. A method according to claim 7, wherein said threshold is calculated using a particular confidence limit.

9. A method according to claim 8, wherein said confidence limit is 95% and wherein said threshold is calculated according to the following formula:

$\overline{X}$+1.96 σ, wherein σ is said standard deviation.

10. A method according to claim 8, wherein said confidence limit is 99% and wherein said threshold is calculated according to the following formula:

$\overline{X}$+2.58 σ, wherein σ is said standard deviation.

11. A system for recognizing a call failure related problem occurring at an egress network of a telephone system and effecting call completion comprising:

a terminating switch;

an out-of-band signaling system for providing information relating to call failures occurring at said egress network;

a loop around trunk coupled to said terminating switch for sampling a predetermined percentage of calls at said egress network; and a protocol analyzer coupled to said loop around trunk for monitoring said information relating to call failures associated with said predetermined percentage of calls, calculating a measured call failure rate based on said monitored information relating to call failures, and comparing said measured call failure rate to a threshold and recognizing when said measured call failure rate exceeds said threshold;

wherein a tolerable call failure rate is calculated by sampling a plurality of calls at said egress network and monitoring said information relating to call failures associated with said plurality of calls and wherein said threshold is calculated based on said tolerable call failure rate and a standard deviation associated with said calculation of said tolerable call failure rate; and wherein said out-of-band signaling system comprises a D-channel of an ISDN line.

* * * * *